(12) United States Patent
Jones et al.

(10) Patent No.: US 9,508,970 B2
(45) Date of Patent: Nov. 29, 2016

(54) ENCLOSURE FOR RECHARGEABLE BATTERIES

(71) Applicant: The Boeing Company, Chicago, IL (US)

(72) Inventors: Kelly T. Jones, Snohomish, WA (US); Al R. Carlo, Mukilteo, WA (US); Alan D. Amort, Lake Forest Park, WA (US); Daniel F. Lewinski, Stanwood, WA (US); Daniel J. Murray, Mill Creek, WA (US); Douglas D. Maben, Snohomish, WA (US); Harry H. Ayubi, Snohomish, WA (US); Howard E. McKenzie, Bothell, WA (US); Julie K. Plessner, Poulsbo, WA (US); Kevin S. Callahan, Shoreline, WA (US); Michael L. Trent, Everett, WA (US); Mike R. Madden, Mount Vernon, WA (US); Mohammad M. Malik, Bothell, WA (US); Richard K. Johnson, Camano Island, WA (US); Royal E. Boggs, Bothell, WA (US)

(73) Assignee: The Boeing Company, Chicago, IL (US)

( * ) Notice: Subject to any disclaimer, the term of this patent is extended or adjusted under 35 U.S.C. 154(b) by 202 days.

(21) Appl. No.: 14/188,685

(22) Filed: Feb. 24, 2014

(65) Prior Publication Data

US 2014/0242423 A1 Aug. 28, 2014

Related U.S. Application Data

(60) Provisional application No. 61/769,176, filed on Feb. 25, 2013, provisional application No. 61/769,187, filed on Feb. 25, 2013.

(51) Int. Cl.
*H01M 2/12* (2006.01)
*H01M 2/10* (2006.01)

(52) U.S. Cl.
CPC ......... *H01M 2/1241* (2013.01); *H01M 2/1072* (2013.01); *H01M 2/1094* (2013.01); *H01M 2/12* (2013.01); *H01M 2/1252* (2013.01); *H01M 2/1016* (2013.01); *H01M 2200/20* (2013.01); *H01M 2220/20* (2013.01)

(58) Field of Classification Search
CPC .......... H01M 2/0257; H01M 2/0262; H01M 2/0285; H01M 2/1235; H01M 2/1241; H01M 2/34; H01M 2/345; H01M 2200/20
See application file for complete search history.

(56) References Cited

U.S. PATENT DOCUMENTS

| 5,609,972 A * | 3/1997 | Kaschmitter | H01M 2/1241 429/56 |
| 5,695,888 A * | 12/1997 | Gage | H01M 2/0257 429/101 |
| 6,007,944 A * | 12/1999 | Bechtold | H01M 2/021 429/211 |

(Continued)

FOREIGN PATENT DOCUMENTS

| EP | 0798793 A2 | 1/1997 |
| GB | 2155687 A | 9/1985 |
| WO | 2012178205 A2 | 12/2012 |

*Primary Examiner* — Scott J Chmielecki
(74) *Attorney, Agent, or Firm* — Miller, Matthias & Hull LLP (57) ABSTRACT

An apparatus comprises a rechargeable battery susceptible to thermal runaway, and a metal enclosure for the battery. The enclosure is configured to mitigate battery failure consequences resulting from thermal runaway.

15 Claims, 9 Drawing Sheets

(56) References Cited

U.S. PATENT DOCUMENTS

| | | |
|---|---|---|
| 6,255,015 B1 | 7/2001 | Corrigan et al. |
| 6,302,578 B1 | 10/2001 | Stevenson et al. |
| 2006/0292436 A1 | 12/2006 | Cook |
| 2010/0028758 A1 | 2/2010 | Eaves et al. |
| 2010/0293959 A1* | 11/2010 | Remy ................ F02C 3/22 60/773 |
| 2011/0129934 A1 | 6/2011 | Agnew |
| 2011/0178648 A1* | 7/2011 | Calvignac ............ F01D 15/10 700/291 |
| 2012/0028090 A1* | 2/2012 | Kyung-Su ........... H01M 2/0413 429/82 |
| 2012/0096879 A1 | 4/2012 | Lam et al. |
| 2013/0032219 A1* | 2/2013 | Heim .................. H01M 2/1241 137/14 |
| 2013/0175041 A1 | 7/2013 | Nellessen |
| 2015/0340673 A1* | 11/2015 | Joswig ............... H01M 2/1072 429/56 |

* cited by examiner

ENCLOSURE FOR RECHARGEABLE BATTERIES

This application claims the benefit of the provisional applications U.S. Ser. No. 61/769,176 filed 25 Feb. 2013; and U.S. Ser. No. 61/769,187 filed 25 Feb. 2013; both of which are incorporated herein by reference.

BACKGROUND

Lithium-ion (Li-Ion) batteries (LIBs) are desirable for mobile computing devices, certain automobiles, and certain aircraft. They have lower weight and higher energy density than rechargeable batteries such as nickel metal hydride and nickel cadmium batteries. They have no memory degradation.

However, certain lithium-ion batteries have longstanding issues with thermal runaway. As used herein, thermal runaway means a situation where an increase in temperature causes a further increase in temperature that may lead to decreased efficiency. For example, heat generated from an exothermic chemical reaction may increase the rate of the chemical reaction. Designers of complex systems may address such inefficiencies in various ways.

SUMMARY

According to an embodiment herein, an apparatus comprises a rechargeable battery susceptible to thermal runaway, and a metal enclosure for the battery. The enclosure is configured to mitigate battery failure consequences resulting from thermal runaway.

According to another embodiment herein, an apparatus comprises a metal enclosure defining a cavity. The enclosure is sealed except for at least one pressure equalization orifice that is always open. The apparatus further comprises a rechargeable battery mounted within the cavity. The battery is susceptible to thermal runaway.

According to another embodiment herein, a battery enclosure comprises ductile metal walls defining a battery cavity, at least one of the walls having pressure equalization orifices; an assembly for mounting a rechargeable battery within the cavity; a normally closed vent valve extending through one of the walls, the valve configured to open in response to a change in cavity pressure corresponding to a battery failure event; and a vent coupled to the vent valve.

According to another embodiment herein, a method of preventing a fire in an enclosure containing a rechargeable battery comprises continuously performing pressure equalization between a first environment inside the enclosure and a second environment surrounding the enclosure. In the event of an abrupt change of pressure in the first environment indicative of a battery failure event, the first environment is vented to a third environment that is remote from the enclosure.

These features and functions may be achieved independently in various embodiments or may be combined in other embodiments. Further details of the embodiments can be seen with reference to the following description and drawings.

DETAILED DESCRIPTION

Figure 1:
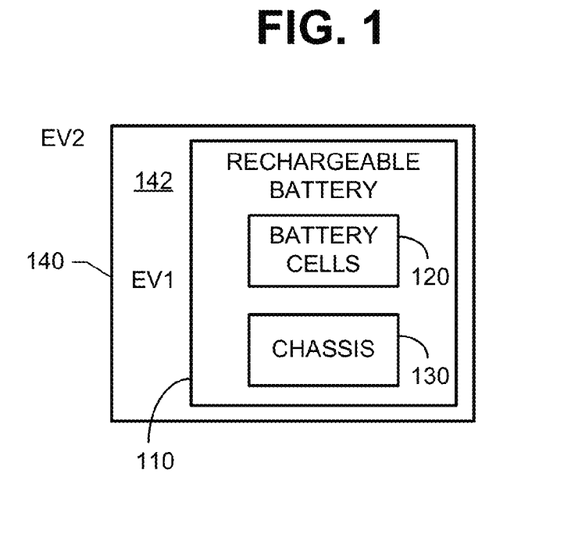
FIG. 1 is an illustration of a system including a rechargeable battery and an enclosure for the rechargeable battery.

Reference is made to FIG. 1, which illustrates a rechargeable battery 110. The rechargeable battery 110 includes a plurality of individual sealed battery cells 120 arranged in a battery chassis 130. Each battery cell 120 may include positive and negative electrodes, an outer case for the electrodes, and electrolyte sealed within the case. The terminals of the battery cells 120 may be interconnected by bus bars.

The battery cells 120 are not limited to any particular chemistry. Examples include, but are not limited to lithium-ion, metal-cadmium, and nickel metal hydride. Depending on the battery chemistry, the battery cells 120 may be susceptible to thermal runaway.

The battery cells 120 are not limited to any particular geometry. For example, the battery cells 120 may be prismatic or cylindrical.

Capacity and power of the battery 110 are dictated by the type of platform for which the battery 110 is intended. In some embodiments, the battery 110 is intended for a passenger vehicle (e.g., an aircraft, automobile, truck, bus, train, or boat).

FIG. 1 also illustrates an enclosure 140 for the rechargeable battery 110. The enclosure 140 defines a cavity 142, and the battery 110 is located within the cavity 142. The enclosure 140 is configured to mitigate battery failure consequences.

Figure 2:
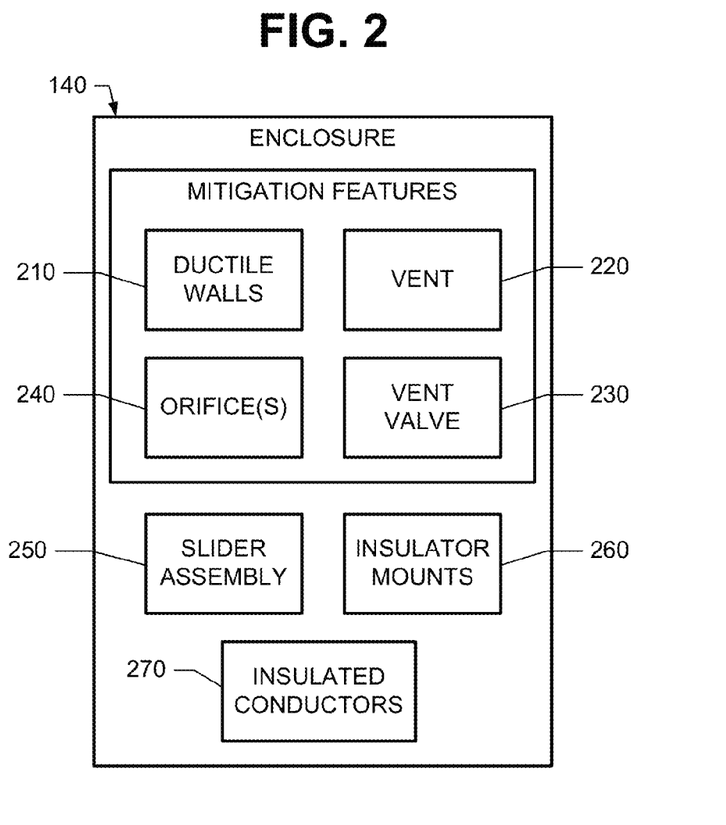
FIG. 2 is an illustration of the enclosure.

Additional reference is now made to FIG. 2. The enclosure 140 may include one or more of the following features for mitigating battery failure consequences.

One or more containment walls 210 of the enclosure 120 may be made of a ductile material. The ductile material increases the enclosure's capacity for energy absorption. Consequently, if the battery failure involves a rupture, which results in a sudden release of gas from the battery 110, the gas impinges the ductile containment walls 210. The ductile containment walls 210 may absorb energy from the gas and deform.

The ductile walls 210 may be made of a corrosion resistant steel. The corrosion resistance is especially important for environments subject to high humidity. In some embodiments, the ductile walls 210 may be made of 0.125" corrosion resistant steel conforming to at least one of either American Society for Testing and Materials (ASTM) standard 304 and 321. In addition to corrosion resistance and ductility, these stainless steels are strong and weldable.

The cavity 142 has a volume that is greater than the volume of the battery 110. The term "free volume" refers to the difference between the cavity volume and the battery volume. The free volume is calculated to contain any materials expelled by the battery 110, as well as minimize the volume of air available to sustain combustion (i.e., not support a stoichiometric mixture).

A first environment (EV1) within the cavity 142 is different than a second environment (EV2) surrounding the enclosure 140. A third environment (EV3) (not shown) is remote from the second environment (EV2) surrounding the enclosure 140. For example, if the enclosure 140 is located within a compartment inside a passenger vehicle, the compartment defines the second environment (EV2), and the third environment (EV3) may be outside the vehicle.

The enclosure 140 has at least one vent 220 that is coupled to the cavity 142 and that extends to the third environment (EV3). The vent 220 is normally closed by a vent valve 230. The vent valve 230 is configured to open the vent 220 once pressure within the enclosure 140 increases above a threshold (the threshold corresponds to a battery failure event). Once the vent 220 has been opened, the environment (EV1) within the cavity 142 is vented to the third environment (EV3). For instance, if gas expelled by the battery 110 continues to increase the pressure within the cavity 142, and if the cavity pressure eventually exceeds the threshold, the vent valve 230 is opened, and the gas is vented to the third environment (EV3).

In some embodiments, the vent valve 230 may be actively sensed and controlled valves. An example of an active vent valve includes a pressure sensor, ball valve, and actuator.

In other embodiments, the vent valve 230 may be a passive valve. Examples of vent valves include spring loaded poppet valves and rupturable diaphragms. Another example is a burst disc assembly, which is described below in greater detail.

One or more containment walls 210 of the enclosure 140 may have one or more orifices 240 that are always open. The orifices 240 place the first environment (EV1) inside the enclosure 140 in fluid communication with the second environment (EV2) outside of the enclosure 140. The orifices 240 are designed to equalize pressure within the cavity 142 with pressure outside the enclosure 140 over durations of a few seconds.

Pressure equalization of the enclosure 140 reduces the fatigue range for the enclosure components. In the case of a large commercial aircraft, the pressure equalization ensures that the battery 110 is not exposed to high altitudes except when the enclosure 140 is vented to an environment outside the aircraft. For example, the orifices 240 can keep the battery 110 at an altitude of less than about 25,000 feet, even when the aircraft is flying at 40,000 feet. Without this feature, the battery pressure could cycle with the ambient airplane pressure, and this could decrease the life of the battery 110.

Pressure equalization of the enclosure also reduces the fatigue range for a vent valve including a rupturable diaphragm. The pressure equalization reduces the pressure differential on opposite sides of the diaphragm.

Yet the orifices 240 also allow pressure caused by a battery failure event to build up within the enclosure 140. That is, they allow the vent valve 230 to detect a battery failure event and activate. The orifices 240 may be configured for a pressure equalization duration that is greater than a predetermined activation time of the vent valve 230. Activation time of a rupturable diaphragm, for instance, may be selected as a function of the composition of the containment walls 210, the latent energy of the combustion fuel, and the speed of a flame front.

The orifices 240 also restrict mass rate of air flow into the enclosure 120 in the event of a battery failure. By doing so, they prevent the flow of air from the environment EV2 to feed a fire inside the enclosure 140. The orifices 240 also restrict the ability of a flame front to pass through them. By doing so, they prevent any flame originating inside the enclosure from reaching the environment EV2.

The orifices 240 may be configured by size and number. In some embodiments, the orifices 240 may have a length-to-diameter ratio of about 16:1.

The orifices 240 are not limited to any particular location in the containment walls 210. However, locating the orifices 240 near (e.g., on the same wall as) the vent 220 ensures that any airflow between the orifices 240 and the vent 220 does not pass over the battery 110 during a battery failure event.

The enclosure 140 may include one or more of these mitigating features 210-240. Some embodiments of the enclosure 140 may include only the ductile walls 210. Some embodiments may include only the orifices 220.

Other embodiments of the enclosure 140 may utilize combinations of these mitigation features 210-240. Some embodiments of the enclosure 140 may utilize the vent 220 and vent valve 230. Some embodiments of the enclosure 140 may utilize the vent 220, vent valve 230, and orifices 240. Some embodiments of the enclosure 140 may utilize all four features 210-240.

Figure 3:
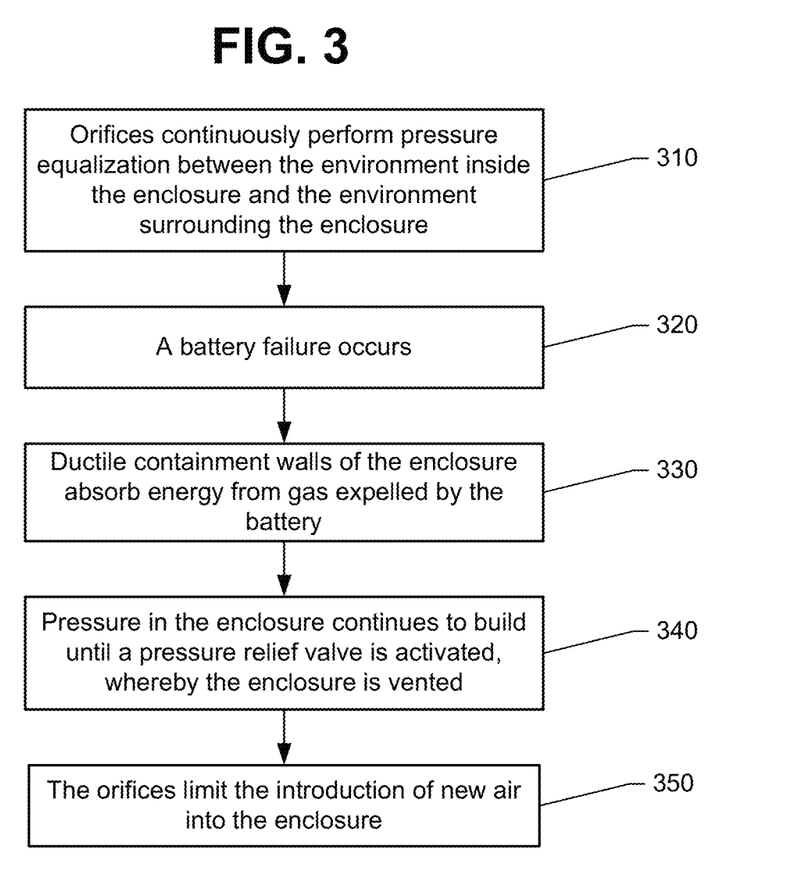
FIG. 3 is an illustration of a method of mitigating consequences of a battery failure in an enclosure containing a rechargeable battery.

Reference is now made to FIG. 3, which illustrates a method of mitigating the consequences of a failure of a rechargeable battery. The battery is susceptible to thermal runaway. This method will be described in connection with a battery inside an enclosure having ductile walls, a vent, a passive vent valve, and pressure equalization orifices.

At block 310, the battery experiences a change in altitudes. As but one example, the battery is aboard an aircraft during flight. During this time, pressure equalization between the environment inside the enclosure and the environment surrounding the enclosure is continuously performed. At this point, the enclosure is completely sealed, except for the orifices As the change in altitudes is being experienced, the battery may or may not be supplying electrical power. For instance, the battery may be provided primarily as a source of backup power.

At block 320, a battery failure event occurs. For instance, an electrical short causes a sizable current to flow between the positive and negative plates of a battery cell. This causes the temperature in the cell to rise, leading to thermal runaway. The thermal runaway then propagates to adjacent cells. Consequently, one or more of the battery's cells rupture. The ruptured battery cell(s) begin to expel material into the enclosure.

At block 330, if a sudden eruption of gas occurs, some of the energy in the gas will be absorbed by the ductile containment walls of the enclosure. However, pressure within the enclosure may still continue to build.

At block 340, the pressure within the enclosure continues to rise until the vent valve is opened. Gas is vented out of the enclosure, and the pressure within the enclosure is reduced.

At block 350, the orifices limit the introduction of new air to feed a possible fire within the enclosure, notably after the vent is opened. The orifices are sized such that if the pressure in the enclosure exceeds the ability of the vent to discharge hot gases, flames cannot escape into the aircraft environment.

Returning to FIG. 2, the enclosure 140 may include a slider assembly 250 for mounting the battery to the enclosure 140 and electrically isolating the battery from the enclosure 140. The slider assembly 250 contains non-conductive parts to ensure the battery does not have a ground path to the enclosure 140.

The enclosure 140 may have isolator mounts 260 that make penetrations into enclosure 140. The isolator mounts 260 allow external electrical connections to be made with components inside the enclosure 140. Each isolator mount 260 may be inserted in an opening in the enclosure 140 and hermetically sealed to the enclosure. Thus, each isolator mount 260 serves a pressure seal for the penetration in the wall 210. The external electrical connections may carry power from the battery and data from a battery monitoring unit (BMU). The BMU, which may be built into the battery, may include electronics for voltage regulation, charging, and sensors.

Electrical conductors 270 within the enclosure 140 may connect the external connections to the battery and the BMU. The conductors 270 may be coated with rhodium. The rhodium coating functions as an insulator sleeve.

The enclosure 140 may be secured to surrounding structure (e.g., a frame), with thermal spacers between the enclosure 140 and the surrounding structure. The enclosure 140 may be covered with an insulative covering (e.g., a thermal blanket). The thermal spacers and the insulative covering prevent heat from a battery failure from propagating to the surrounding structure.

The enclosure 140 may be configured as a Faraday cage in order to prevent damage to electronics from unwanted effects of high energy electromagnetic pulses. Configured as such, the enclosure 140 is continuously electrically conductive, with no (electrically non-conductive) gaps in any direction.

Figure 4:
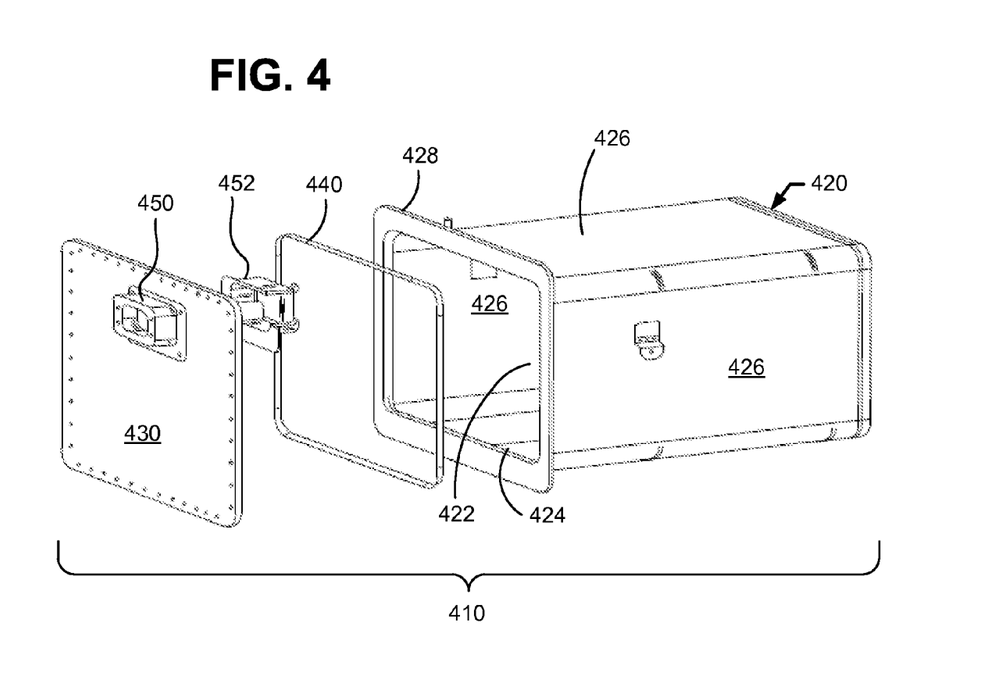
FIGS. 4, 5 and 6 are illustrations of a system including a battery enclosure.

Reference is now made to FIG. 4, which illustrates an example of an enclosure 410. The enclosure 410 includes a partial enclosure 420 that defines a cavity 422 with an open portion accessible via an opening 424. Containment walls 426 of the partial enclosure 420 may be made of a ductile material, such as a ductile stainless steel. For example, the walls 426 may be made of 0.125" corrosion resistant steel conforming to either American Society for Testing and Materials (ASTM) standard 304 or 321.

The enclosure 410 further includes an enclosure cover 430 that may also be made of a ductile material. The cover 430 is mounted (e.g., fastened) to a flange 428 at the open end of the partial enclosure 420. A seal 440 such as an O-ring gasket may be used to seal the junction between the partial enclosure 420 and enclosure cover 430. In other embodiments, a sealant material may be applied in a continuous pattern to seal the junction between partial enclosure 420 and the enclosure cover 430.

The seal 440 may include a heat-stabilized silicon member loaded with iron oxide. This enables the seal to provide pressure sealing before, during and after exposure to 575° F. and a maximum differential pressure of 90 PSID. The seal 440 may sit in a groove (not shown) in either the partial enclosure 420 or the cover 430. The seal groove is configured to accommodate thermal growth of the seal 440 during the high temperature exposure.

An electrical receptacle 450 is mounted on the enclosure cover 430. Hardware for mounting the receptacle 450 to the door may be covered on a back side portion with a non-conductive connector cover 452. The connector cover 452 prevents inadvertent cross connecting the battery's terminals. The receptacle 450 provides electrical connector pins (not shown in FIG. 4). Isolator mounts (not shown in FIG. 4, but shown in FIG. 9) enable the receptacle 450 to be attached to the cover 430.

Figure 5:
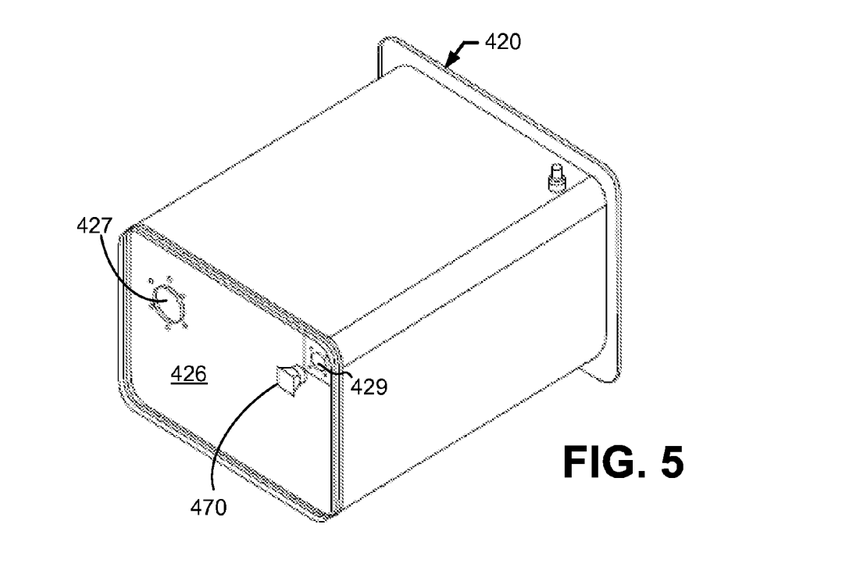

Additional reference is made to FIG. 5, which illustrates a closed end of the partial enclosure 420. The wall 426 at the closed end has an opening 427 for a vent valve. The wall 426 has a second opening 429 for an isolator mount 470. The isolator mount 470 allows external electrical connections to be made with components inside the cavity 422.

Figure 6:
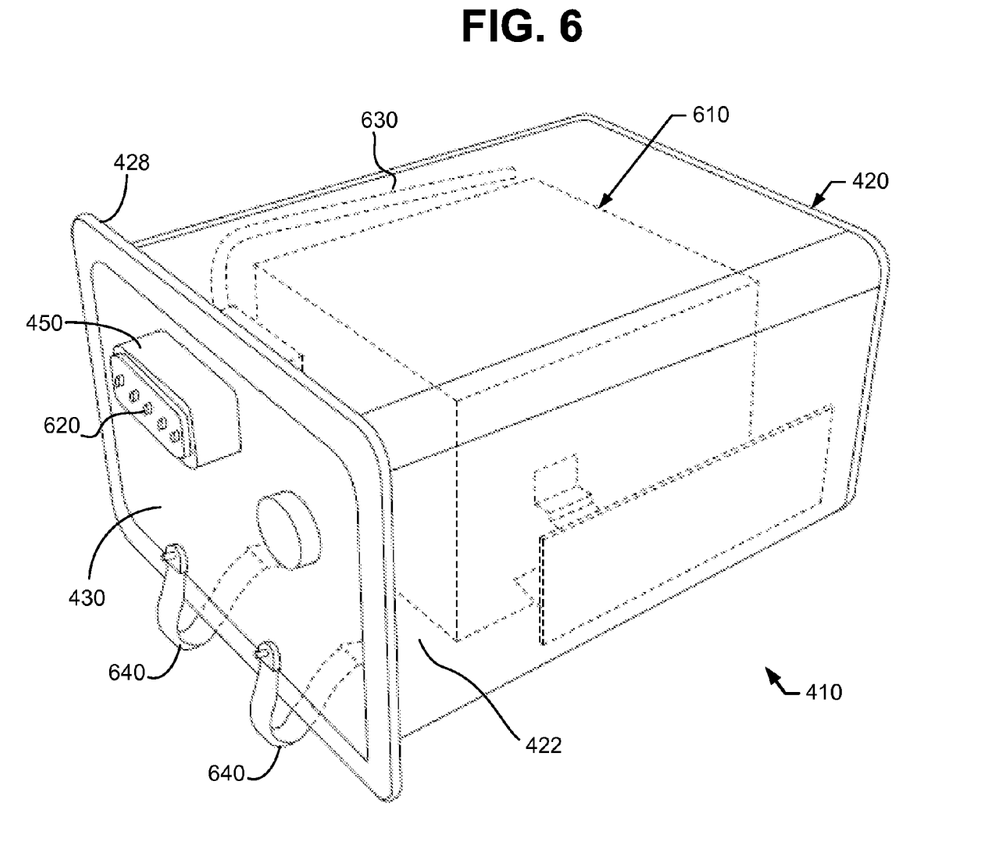

Additional reference is made to FIG. 6, which illustrates a rechargeable battery 610 within cavity 422. FIG. 6 also illustrates the cover 430 sealed to the flange 428 of the partial enclosure 420. The battery 610 is connected to electrical connector pins 620 via rhodium-coated conductors 630 that function as insulator sleeves. The electrical connector pins 620 are mounted to the cover 430 via the first insulator mount 450. Ground straps 640 may be used to electrically ground the enclosure 410.

Figure 7:
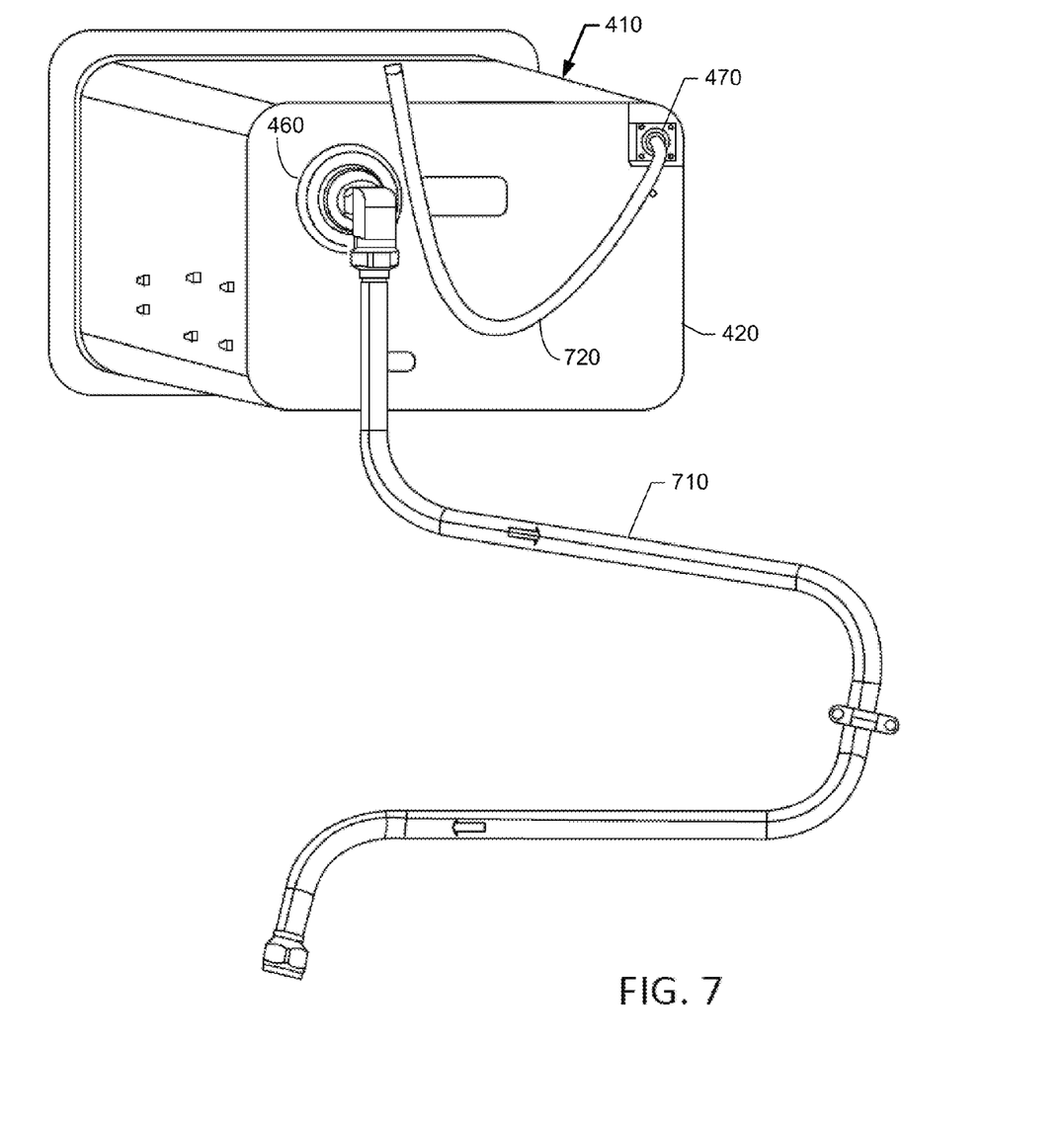
FIG. 7 is an illustration of a vent connected to a battery enclosure.

Reference is now made to FIG. 7, which illustrates a vent 710 connected to a burst disc assembly 460, which is mounted to the closed end of the partial enclosure 420. FIG. 7 also illustrates a sensor wire 720 connected to an electrical connector. The electrical connector is supported within the isolator mount 470.

Figure 8A:
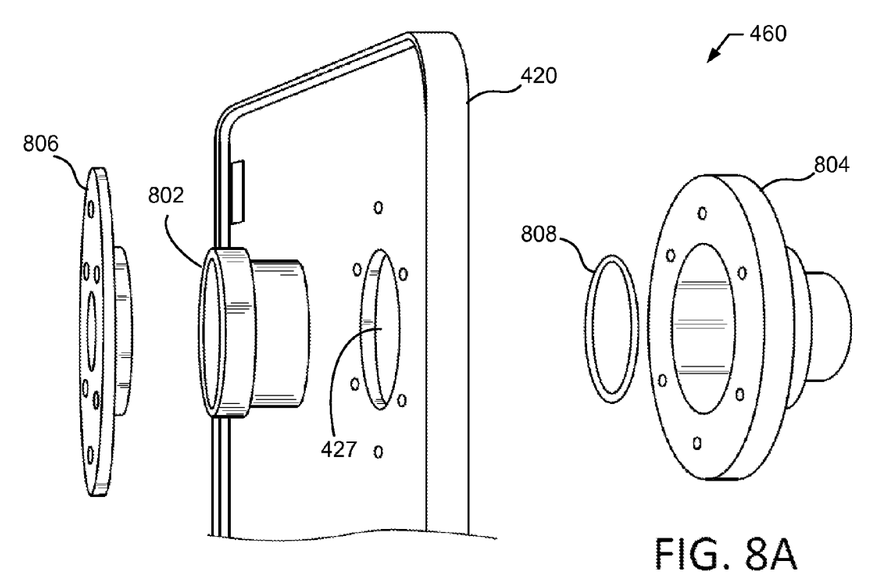
FIGS. 8A-8C are illustrations of a burst disc assembly.

FIG. 8A is an exploded view of the burst disc assembly 460. The assembly 460 includes a burst disc element 802, a pressure disc retainer 804, and an enclosure fitting 806. The burst disc element 802 is a Line Replaceable Unit (LRU) that extends through the opening 429 in the wall 426 at the closed end of the partial enclosure 420. The retainer 804 and the enclosure fitting 806 are on opposite sides of the wall 426 to retain the burst disc element 802. The retainer 804 and the wall 426 may have aligned orifices for pressure equalization. Both the retainer 804 and the enclosure fitting 806 provide appropriate surfaces for locating static seals against the enclosure 420. The bust disc element 802 may be sealed by an O-ring 808. The enclosure fitting 806 may be removed to allow the burst disc element 802 to be removed and replaced.

The burst disc element 802 includes a thin hemispherical membrane 803 that ruptures when absolute difference in pressure on its inner and outer portions exceeds a design limit. The burst disc element 802 may be composed of a weldable stainless steel conforming to ASTM 316 or 304. The pressure disc retainer 804 and the enclosure fitting 806 may be composed of stainless steel conforming to ASTM 321 (which is not weldable, but is more machinable than ATSM 316 and 304).

Figure 8B:
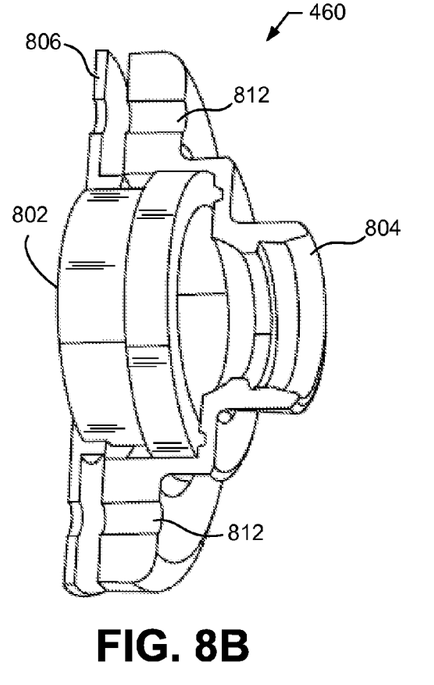

FIG. 8B illustrates the burst disc assembly 460 mounted to the closed end of the partial enclosure 420. Portions of the retainer 804 and the enclosure fitting 806 are removed to illustrate two pressure equalization orifices 812. In some embodiments, each orifice 812 may have a diameter of about $\frac{1}{32}$ inches, and a length of about ½ inches.

The vent 710 is secured to the retainer 804. Although the burst disc assembly 460 is shown as being located at the closed end of the partial enclosure 420, it is not so limited.

Figure 8C:
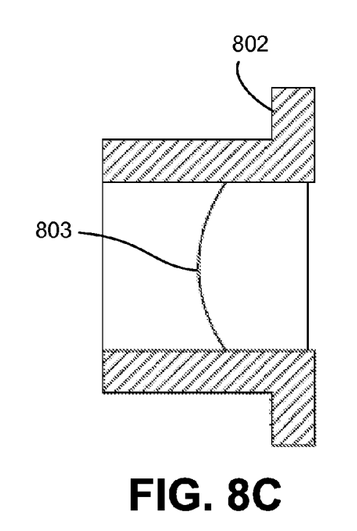

FIG. 8C illustrates the burst disc assembly 802. In particular, FIG. 8c illustrates the hemispherical membrane 803 of the burst disc assembly 802.

Figure 9:
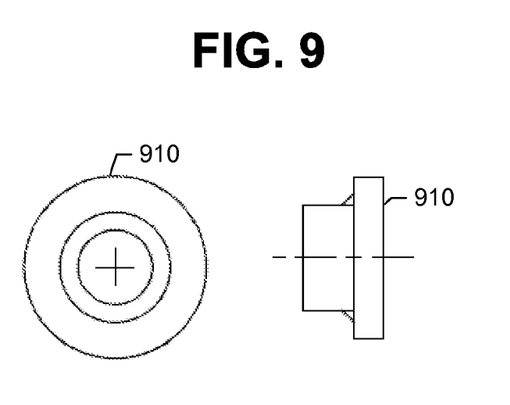
FIG. 9 is an illustration of an isolator mount.

FIG. 9 illustrates an isolator mount 910 in the shape of a bushing (a sleeve and a flange). The isolator mounts 910 may be made of a material that is non-porous, non-shrinking, having a high dielectric strength, high electrical resistivity, and high temperature resistance. Examples of the material include glass, ceramic, or a composition including both glass and ceramic. For instance, the material may be a machinable glass ceramic (e.g., Corning Macor™ Machinable Glass Ceramic). The isolator mount 910 is designed to ensure no compromise of the pressure seal in the event of a "hot" short, wherein temperatures of the conductors may reach 1800° F. and pressures up to 100 pounds per square inch.

Figure 10:
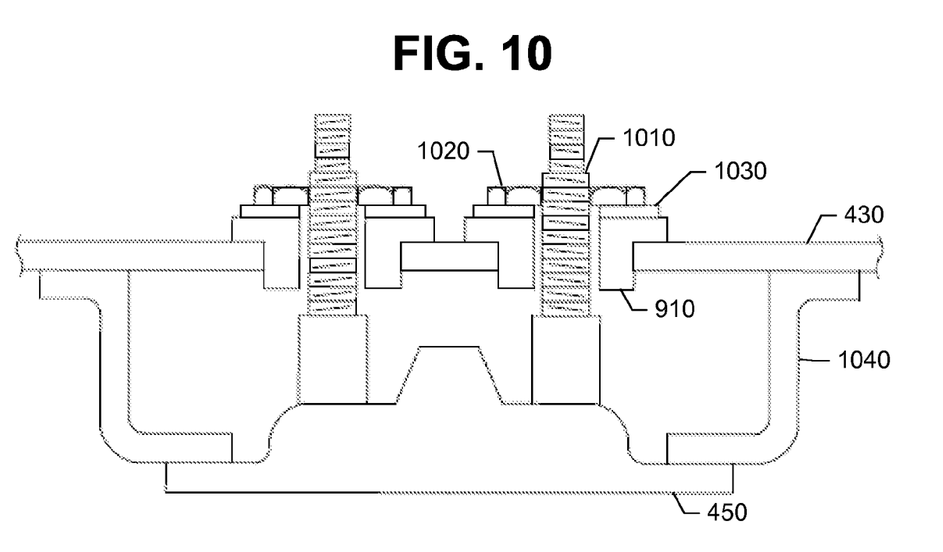
FIG. 10 is an illustration of an electrical receptacle mounted to a cover of the enclosure.

FIG. 10 illustrates the use of two isolator mounts 910 to mount a receptacle 450 to the cover 430. The two isolator mounts 910 penetrate the cover 430 from inside the enclosure 410. Threaded studs 1010 extend from the receptacle 450 and through the isolator mounts 910. These studs 1010 are terminated with a jam nut 1020 and fender washer 1030. A fitting 1040 surrounds the receptacle 1010.

One end of power wires may be attached to the studs 1010 with washers and nuts. The other end of the power wires may be attached to a standard battery plug. The plug fits the existing receptacle on the face of the battery.

Figure 11:
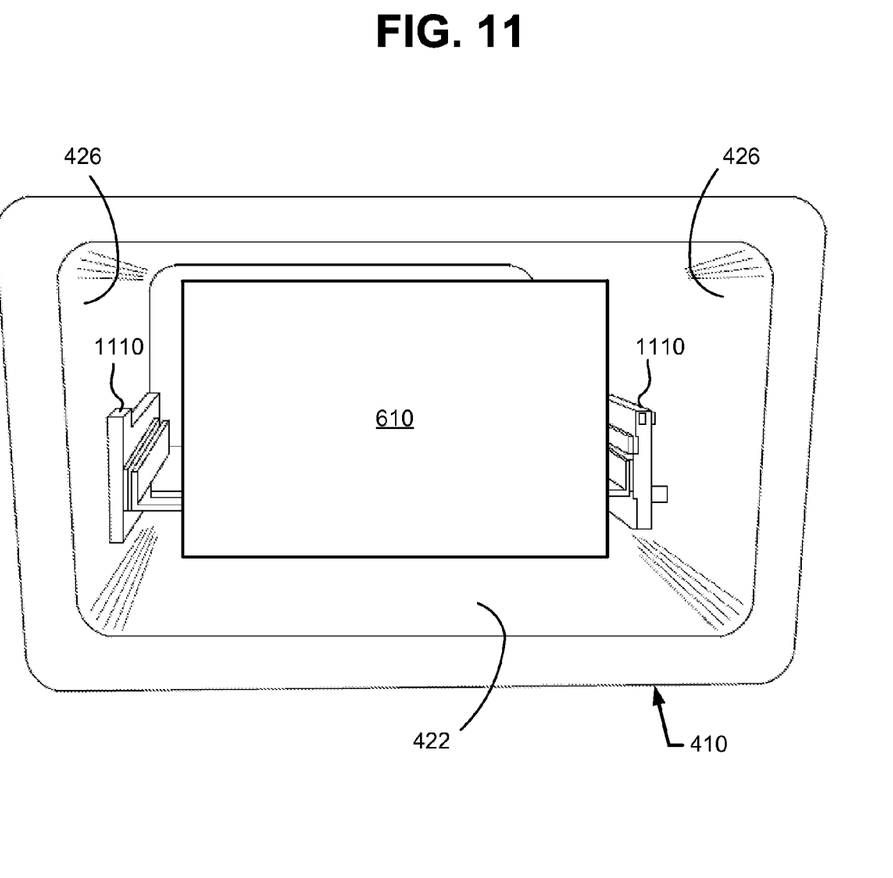
FIG. 11 is an illustration of a battery mounted to the enclosure by slider rails.

FIG. 11 is an illustration of a battery 610 mounted inside the enclosure 410. The battery 610 is mounted within the cavity 422 and spaced apart from the walls 426 by slider rails 1110. The slider rails 1110 may be made of an electrically non-conductive material so as to electrically isolate the battery 610 from the walls 426. The slider rails 1110 enable the battery 610 to be slid in and out of the cavity 422.

Figure 12:
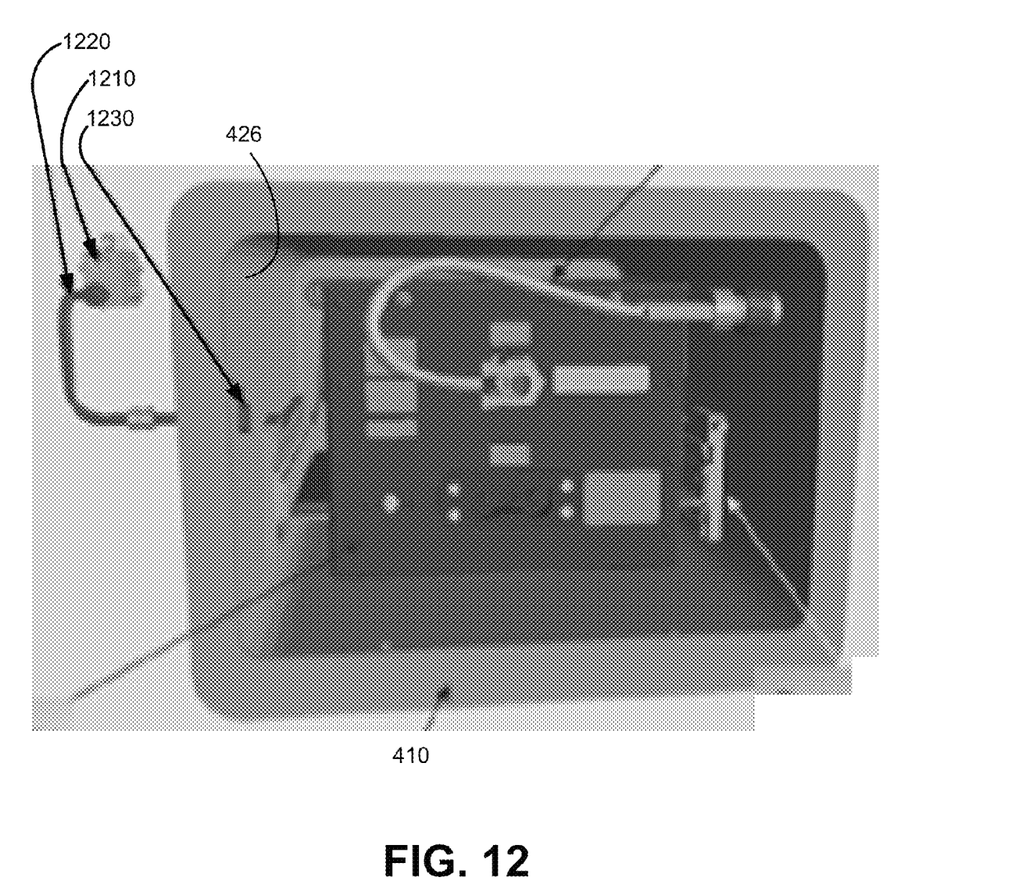
FIG. 12 is an illustration of an enclosure configured with a mechanical differential pressure indicator.

FIG. 12 illustrates an embodiment of a mechanical differential pressure indicator 1210 for providing a persistent visual indication of when the vent valve has opened the vent. The mechanical indicator 1210 is in pneumatic communication through a titanium or other high temperature tube 1220 to a pressure orifice 1230, which is disposed in a wall 426 of the enclosure 410. In this embodiment, the pressure orifice 1230 has a predetermined aspect ratio to provide both nominal pressure equalization for the enclosure 410, while allowing pressure to operate the vent valve. The mechanical indicator 1210 may be a pressure-operated device that provides the persistent visual indication. The visual indication may be, for example, a color strip that is only visible when the vent valve has opened. One may infer the status of the vent valve based on a visual observation of the status of mechanical indicator 1210. The status of the mechanical indicator 1210 may be provided to a remote user, such as an operator of a vehicle located in a cockpit or crew station.

In other embodiments, the mechanical indicator 1210 may be replaced by an electrical switch (not shown) or other electrical sensing device in a circuit configured to provide an indication of a condition that caused the vent valve to operate or open. Alternatives to the mechanical indicator 1210 may be constructed using a piezoelectric sensor, a fusable conductor, and a resettable pressure indicator.

The invention claimed is:

1. An apparatus comprising:
a rechargeable battery susceptible to thermal runaway;
a metal enclosure for the battery, the enclosure being configured to mitigate battery failure consequences resulting from thermal runaway;
a vent for venting the enclosure to an environment remote from the enclosure, a wall of the enclosure having an opening for the vent; and
a normally closed vent valve for opening the vent when pressure inside the enclosure corresponds to a battery failure event, the vent valve including a burst disc element extending through the opening in the wall, and a retainer and an enclosure fitting on opposite sides of the wall for holding the burst disc element in the opening, the vent being attached to the retainer;
wherein the retainer and the wall have aligned orifices for pressure equalization.

2. The apparatus of claim 1, wherein the enclosure comprises one or more containment walls made of a ductile material.

3. The apparatus of claim 2, wherein the ductile material includes 0.125" stainless steel.

4. The apparatus of claim 1, wherein the enclosure includes free volume for containing materials expelled by the battery as a result of thermal runaway.

5. The apparatus of claim 1, wherein a containment wall of the enclosure has an opening for the vent, and wherein the vent valve includes a rupturable diaphragm located at the opening.

6. The apparatus of claim 1, wherein the burst disc element includes a thin hemispherical membrane that is configured to rupture when an absolute difference in pressure on its inner and outer portions exceeds a design limit.

7. The apparatus of claim 1, wherein the orifices are configured for pressure equalization while allowing pressure caused by a battery failure event to build up within the enclosure and activate the vent valve.

8. The apparatus of claim 7, wherein the orifices are configured for a pressure equalization duration that is greater than a predetermined activation time of the vent valve.

9. The apparatus of claim 8, wherein the orifices are further configured to restrict mass rate of air flow into the enclosure during a battery failure event.

10. The apparatus of claim 9, wherein the orifices have a length-to-diameter ratio of about 16:1.

11. The apparatus of claim 7, wherein the orifices are located near the vent.

12. The apparatus of claim 1, wherein the battery is a passenger vehicle battery.

13. The apparatus of claim 1, further comprising a mechanical differential pressure indicator in fluid communication with a battery cavity within the enclosure for providing a persistent visual indication of when the vent valve has opened the vent.

14. An apparatus, comprising:
a rechargeable battery susceptible to thermal runaway;
a metal enclosure for the battery, the enclosure being configured to mitigate battery failure consequences resulting from thermal runaway, the enclosure defining a first environment surrounding the battery;
at least one orifice formed in a wall of the enclosure configured for pressure equalization between the first environment and a second environment surrounding the enclosure;
a vent extending to a third environment that is remote from the second environment, the vent being configured to vent the first environment to the third environment; and
a normally closed vent valve for opening the vent when pressure in the first environment corresponds to a battery failure event.

15. An apparatus, comprising:
a rechargeable battery susceptible to thermal runaway;
a metal enclosure for the battery, the enclosure being configured to mitigate battery failure consequences resulting from thermal runaway;
a normally closed vent valve extending through an opening in a wall of the enclosure, the vent valve opening a vent that vents the enclosure when pressure inside of the enclosure corresponds to a battery failure event; and
at least one orifice extending through the wall of the enclosure near the opening and through the vent valve, the at least one orifice being configured to equalize pressure in the enclosure with a pressure outside of the enclosure.

* * * * *